(No Model.)
O. A. STEMPEL.
APPARATUS FOR GENERATING STEAM AND HEATING ROOMS.
No. 363,305. Patented May 17, 1887.
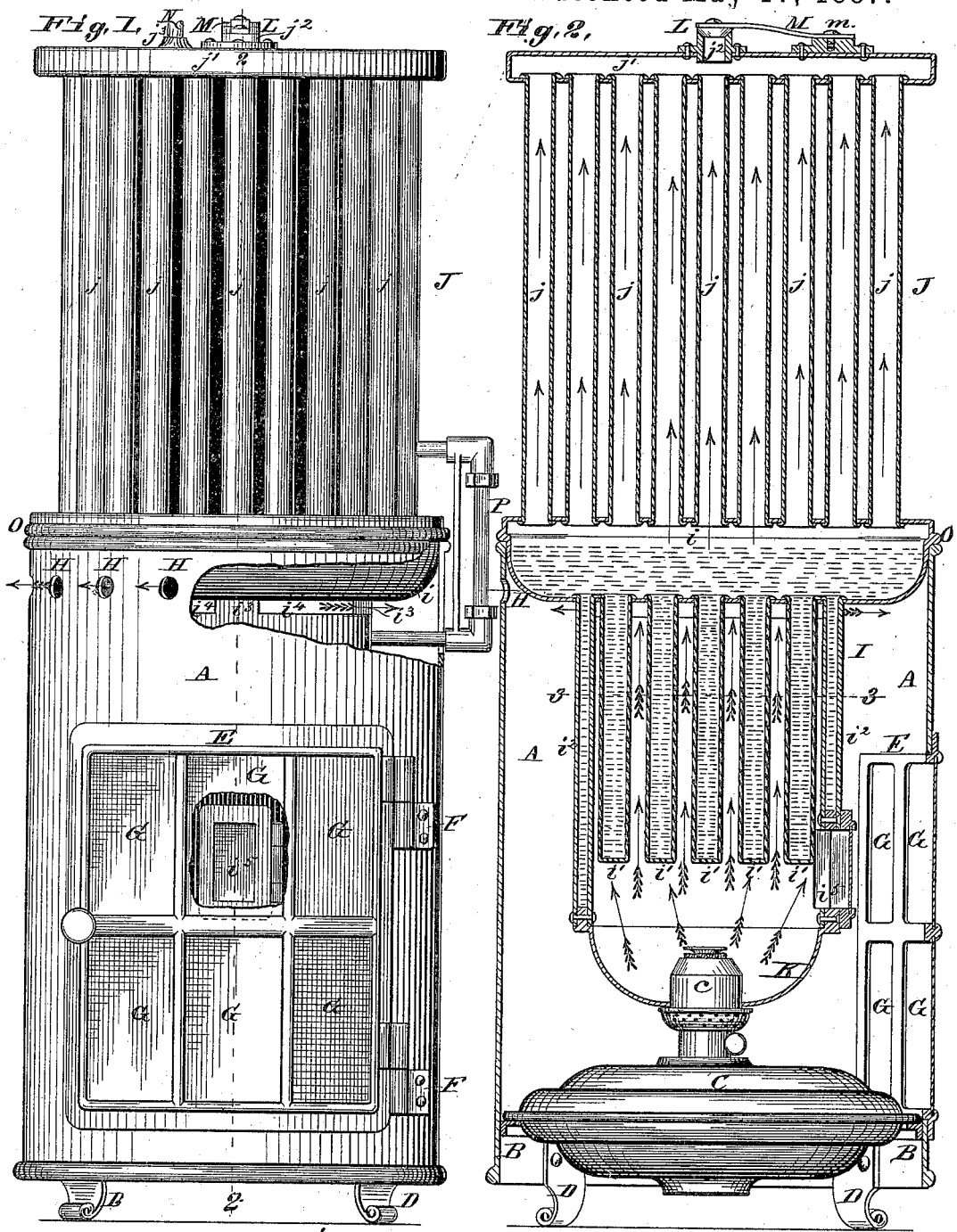

UNITED STATES PATENT OFFICE.

OMAR A. STEMPEL, OF ST. LOUIS, MISSOURI, ASSIGNOR OF ONE-HALF, BY MESNE ASSIGNMENTS, TO FERDINAND MEYROSE, OF SAME PLACE.

APPARATUS FOR GENERATING STEAM AND HEATING ROOMS.

SPECIFICATION forming part of Letters Patent No. 363,305, dated May 17, 1887.

Application filed November 9, 1885. Serial No. 182,286. (No model.)

*To all whom it may concern:*

Be it known that I, OMAR A. STEMPEL, of the city of St. Louis, in the State of Missouri, have invented a certain new and useful Improvement in Apparatuses for Generating Steam and Heating Rooms, of which the following is a full, clear, and exact description, reference being had to the accompanying drawings, forming part of this specification, and in which—

Figure 1 is an elevation of the apparatus with part broken out. Fig. 2 is a vertical section at 2 2, Fig. 1. Fig. 3 is a detail horizontal section at 3 3, Fig. 2.

In this apparatus steam is generated in a water-vessel by a lamp beneath it and ascends into a heater having a safety-valve, which also forms a removable plug, that can be turned to one side when putting water into the apparatus.

A is a case, which may be of cylindrical form, as shown, and which has bracket or brackets, B, for the support of a lamp, C, which is preferably of the construction shown. The case A is supported on legs D, so as to leave a space beneath for the entrance of air to feed the flame of the lamp.

E is a door turning on hinges F, and having pane or panes G of glass or mica, the opening which the door is employed to close being of sufficient size to permit the removal of the lamp therethrough.

H are holes in the case A, near the top, for the exit of the gaseous products of combustion.

The boiler I and heater J are made in one piece, having a central circular chamber, $i$, from which descend a number of pipes, $i'$, closed at the lower end and open at top, to the chamber $i$. From the chamber $i$ also descends an annular water-leg, $i^2$, in direct communication with the chamber $i$ at $i^3$, having apertures $i^4$, through which the products of combustion escape outward. The water-leg is closed at bottom. To the lower end of the water-leg $i^2$ is connected the upper edge of an annular cap, K, having at the center an aperture, through which ascends the lamp-burner $c$. In the side of the water-leg is an aperture, $i^5$, in which is set a sheet of mica to enable the flame of the lamp to be seen. If preferred, the legs D may be attached to the lamp, and the boiler and heater be supported thereon.

The heater J has a number of steam-pipes, $j$, open at the lower end to the chamber $i$ and open at the upper end to a steam-chamber, $j'$, having an orifice, $j^2$, covered by a safety-valve, L. The safety-valve is supported on the end of a spring, M, which is pivoted by a vertical pivot at $m$ to the top of the heater. The force of the spring is such as to hold down the valve against a pressure of steam of ten pounds or less, so that there can be no danger from steam-pressure. The escape of steam indicates that the flame of the lamp should be decreased by turning down the wick.

When filling water into the boiler, the safety-valve is raised from its seat and swung around on the pivot $m$, and the water poured through the valve-port $j^2$.

I am aware steam-heaters having the same general characteristics as the one herein described have been provided with safety-valves, and I do not claim such as my invention. I believe it to be new, however, to cover the filling-orifice of a boiler of the character in question with a plug or stopper, which is secured to one end of a plate-spring of the requisite strength to hold said stopper in place against a certain predetermined amount of steam-pressure, the other end of said spring being pivoted or hinged, the axis of said hinge or pivot being parallel with the plane in which the spring exerts its pressure, (or, in other words, perpendicular to the plane of the spring itself,) so that said pivot serves not only to hold said spring to its work, but also as a center about which said spring may be moved in its own plane, for the purpose of moving the plug to one side of the filling-orifice.

$j^3$ is a screw-threaded nipple, into which a pipe, N, may be screwed to conduct the steam away to another heater or to any other place. In the absence of the pipe the nipple is closed by an ordinary screw plug or cap.

The combined boiler and heater is supported on the case A by a bead, O, which rests on the top of the case.

P is a water-gage having its ends in communication, respectively, with the water-leg and one of the pipes $j$. A pressure-gage may be attached; but this is not necessary.

It will be seen that when the apparatus has no steam-pipe connection with any other thing it is portable.

The heater J would usually have greater height than shown in the drawings.

I claim—

1. The combination of the case or drum A, the lamp C within the same, and a boiler, I, consisting of the chamber $i$, the annular water-leg extending downward therefrom and over the flame of the lamp, having perforations $i^t$ near the top, and the pipes $i'$, projecting downward within the chamber formed by the water-leg, substantially as set forth.

2. The combination, with the lamp C and the boiler I, consisting of chamber $i$, the annular water-leg $i^2$, projecting downward therefrom over the flame, having perforations $i^t$ at top, and pipes $i'$, projecting downward within the chamber formed by said water-leg, of the cup K, extending downward from the bottom of the leg and perforated at the bottom for the admission of the burner, substantially as set forth.

OMAR A. STEMPEL.

In presence of—
SAML. KNIGHT,
JOSEPH WAHLE.